(12) United States Patent
Dong

(10) Patent No.: US 12,118,024 B2
(45) Date of Patent: Oct. 15, 2024

(54) SEARCH APPARATUS, SEARCH METHOD, AND COMPUTER READABLE RECORDING MEDIUM

(71) Applicant: NEC Corporation, Tokyo (JP)

(72) Inventor: Tingting Dong, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/278,762

(22) PCT Filed: Mar. 26, 2021

(86) PCT No.: PCT/JP2021/013097
§ 371 (c)(1),
(2) Date: Aug. 24, 2023

(87) PCT Pub. No.: WO2022/201541
PCT Pub. Date: Sep. 29, 2022

(65) Prior Publication Data
US 2024/0184815 A1    Jun. 6, 2024

(51) Int. Cl.
*G06F 16/332* (2019.01)
*G06F 16/33* (2019.01)
(Continued)

(52) U.S. Cl.
CPC ........ *G06F 16/3329* (2019.01); *G06F 16/334* (2019.01); *G06F 16/338* (2019.01); *G06F 40/40* (2020.01)

(58) Field of Classification Search
None
See application file for complete search history.

(56) References Cited

U.S. PATENT DOCUMENTS

| 6,185,560 B1 * | 2/2001 | Young | F25B 49/02 |
| | | | 707/999.005 |
| 2004/0042661 A1 * | 3/2004 | Ulrich | G06V 10/422 |
| | | | 382/181 |

(Continued)

FOREIGN PATENT DOCUMENTS

| JP | H10-260990 A | 9/1998 |
| JP | 2007-299159 A | 11/2007 |

(Continued)

OTHER PUBLICATIONS

International Search Report for PCT Application No. PCT/JP2021/013097, mailed on Jun. 22, 2021.

(Continued)

*Primary Examiner* — Irene Baker
(74) *Attorney, Agent, or Firm* — Sughrue Mion, PLLC

(57) ABSTRACT

A search apparatus including: a search target extraction unit that references a data set use of a search criterion that includes attribute information, and extracts search target information that include the attribute information that match the attribute information of the search criterion; a score calculation unit that, in a case where the number of the extracted search target information pieces is not within a preset search result range, references a knowledge base and calculates a score for each of the attribute information pieces included in the extracted search target information pieces with use of a score function that has been determined in advance; a question generation unit that selects an attribute information piece based on the calculated scores, and generates question information use of the selected attribute information piece; and a search criterion generation unit that reflects an attribute information piece indicated by a response of the user to the question information in the search criterion, thereby generates a new search criterion.

12 Claims, 8 Drawing Sheets

(51) Int. Cl.
    *G06F 16/338*     (2019.01)
    *G06F 40/40*     (2020.01)

(56) References Cited

U.S. PATENT DOCUMENTS

| | | | | |
|---|---|---|---|---|
| 2009/0310504 | A1* | 12/2009 | Engbersen | H04L 47/20 |
| | | | | 370/252 |
| 2011/0188759 | A1* | 8/2011 | Filimonova | G06F 16/93 |
| | | | | 382/195 |
| 2012/0203752 | A1* | 8/2012 | Ha-Thuc | G06F 16/35 |
| | | | | 707/706 |
| 2018/0089543 | A1* | 3/2018 | Merler | G06F 18/2415 |
| 2021/0142097 | A1* | 5/2021 | Zheng | G06V 10/255 |
| 2022/0343626 | A1* | 10/2022 | Gong | G06V 10/76 |

FOREIGN PATENT DOCUMENTS

| | | |
|---|---|---|
| JP | 2011-107887 A | 6/2011 |
| JP | 2012-248161 A | 12/2012 |

OTHER PUBLICATIONS

English translation of Written opinion for PCT Application No. PCT/JP2021/013097, mailed on Jun. 22, 2021.

\* cited by examiner

DATA SET

| PERSON ID | ATTRIBUTE INFORMATION | | | | PORTRAIT IMAGE |
|---|---|---|---|---|---|
| | SEX | AGE | OUTFIT COLOR | EYEGLASSES | |
| 1 | MALE | 30s | BRIGHT RED | NONE |  |
| 2 | MALE | 30s | CRIMSON | NONE |  |
| 3 | FEMALE | 30s | BROWN | NONE |  |
| 4 | MALE | 40s | FIREBRICK | CORRECTIVE EYEGLASSES |  |
| 5 | MALE | 40s | DARKRED | NONE |  |
| 6 | MALE | 40s | BROWN | SUNGLASSES |  |
| 7 | MALE | 30s | LIGHTCORAL | SUNGLASSES |  |
| 8 | MALE | 50s | LIGHTCORAL | NONE |  |
| 9 | MALE | 60s | SALMON | NONE |  |

DATA SET

| PERSON ID | ATTRIBUTE INFORMATION | | | | PORTRAIT IMAGE |
|---|---|---|---|---|---|
| | SEX | AGE | OUTFIT COLOR | EYEGLASSES | |
| 3 | FEMALE | 30s | BROWN | NONE |  |
| 4 | MALE | 40s | FIREBRICK | CORRECTIVE EYEGLASSES |  |
| 5 | MALE | 40s | DARKRED | NONE |  |
| 6 | MALE | 40s | BROWN | SUNGLASSES |  |

SEARCH APPARATUS, SEARCH METHOD, AND COMPUTER READABLE RECORDING MEDIUM

This application is a National Stage Entry of PCT/JP2021/013097 filed on Mar. 26, 2021, the contents of all of which are incorporated herein by reference, in their entirety.

TECHNICAL FIELD

The present invention relates to a search apparatus and a search method that perform a search based on a search criterion, and further relates to a computer readable recording medium that includes a program for realizing them recorded thereon.

BACKGROUND ART

When searching for an image of a person or an object, the search is performed by generating a search criterion. However, as a user cannot grasp an enormous amount of data, it is difficult to generate a search criterion that is optimum for the search. Therefore, a substantial effort and a great amount time are required to obtain a target search result.

As a related technique, patent document 1 discloses a conversational scenario generation system that generates scenario data that enables a conversation to be continued until FAQ data desired by a user is obtained.

According to the system of patent document 1, in a case where the number of pieces of search target data is three or more, the combinations of pairs of an attribute and its attribute value of these pieces of search target data are organized in view of pairs of an attribute and an attribute value that are not included in these combinations.

In the system of patent document 1, in a case where the intention of the user has been distinguished to be related to these combinations via a conversation between the user and the system, an attribute value of an attribute that is not included in these combinations is presented to the user as a selection candidate. Then, scenario data is generated that is intended to cause a selection for narrowing down the pieces of search target data to be made.

LIST OF RELATED ART DOCUMENTS

Patent Document

Patent document 1: Japanese Patent Laid-Open Publication No. 2012-248161

SUMMARY

Technical Problems

However, as the system of patent document 1 is a system that searches for FAQ data desired by the user through a conversation between the user and the system, it is difficult to apply the system to a search for image data. That is to say, as pieces of image data and the like have many similarities and overlapping portions, it is difficult to apply the system of patent document 1 thereto.

As one aspect, an example object is to provide a search apparatus, a search method, and a computer readable recording medium that obtain a search result efficiently by updating a search criterion based on a user's response to a question.

Solution to the Problems

In order to achieve the example object described above, a search apparatus according to an example aspect includes:
  a search target extraction unit that references a data set that includes search target information pieces in which an image and one or more attribute information pieces are associated with use of a search criterion that includes one or more attribute information pieces, and extracting search target information pieces that include the attribute information pieces that match the attribute information pieces of the search criterion;
  a score calculation unit that, in a case where the number of the extracted search target information pieces is not within a preset search result range, references a knowledge base in which attribute information pieces are classified hierarchically, and calculates a score for each of the attribute information pieces included in the extracted search target information pieces with use of a score function that has been determined in advance;
  a question generation unit that selects an attribute information piece based on the calculated scores, and generates question information indicating a question to be presented to a user with use of the selected attribute information piece; and
  a search criterion generation unit that reflects an attribute information piece indicated by a response of the user to the question information in the search criterion, thereby generating a new search criterion.

Also, in order to achieve the example object described above, a search method according to an example aspect includes:
  referencing a data set that includes search target information pieces in which an image and one or more attribute information pieces are associated with use of a search criterion that includes one or more attribute information pieces, and extracting search target information pieces that include the attribute information pieces that match the attribute information pieces of the search criterion;
  in a case where the number of the extracted search target information pieces is not within a preset search result range, referencing a knowledge base in which attribute information pieces are classified hierarchically, and calculating a score for each of the attribute information pieces included in the extracted search target information pieces with use of a score function that has been determined in advance;
  selecting an attribute information piece based on the calculated scores, and generating question information indicating a question to be presented to a user with use of the selected attribute information piece; and
  reflecting an attribute information piece indicated by a response of the user to the question information in the search criterion, thereby generating a new search criterion.

Furthermore, in order to achieve the example object described above, a computer-readable recording medium according to an example aspect includes a program recorded on the computer-readable recording medium, the program including instructions that cause the computer to carry out:
  referencing a data set that includes search target information pieces in which an image and one or more attribute information pieces are associated with use of a search criterion that includes one or more attribute information pieces, and extracting search target information pieces that include the attribute information pieces that match the attribute information pieces of the search criterion;

in a case where the number of the extracted search target information pieces is not within a preset search result range, referencing a knowledge base in which attribute information pieces are classified hierarchically, and calculating a score for each of the attribute information pieces included in the extracted search target information pieces with use of a score function that has been determined in advance;

selecting an attribute information piece based on the calculated scores, and generating question information indicating a question to be presented to a user with use of the selected attribute information piece; and reflecting an attribute information piece indicated by a response of the user to the question information in the search criterion, thereby generating a new search criterion.

Advantageous Effects of the Invention

As described above, it is possible to obtain a search result efficiently by updating a search criterion based on a user's response to a question.

EXAMPLE EMBODIMENT

Figure 1:
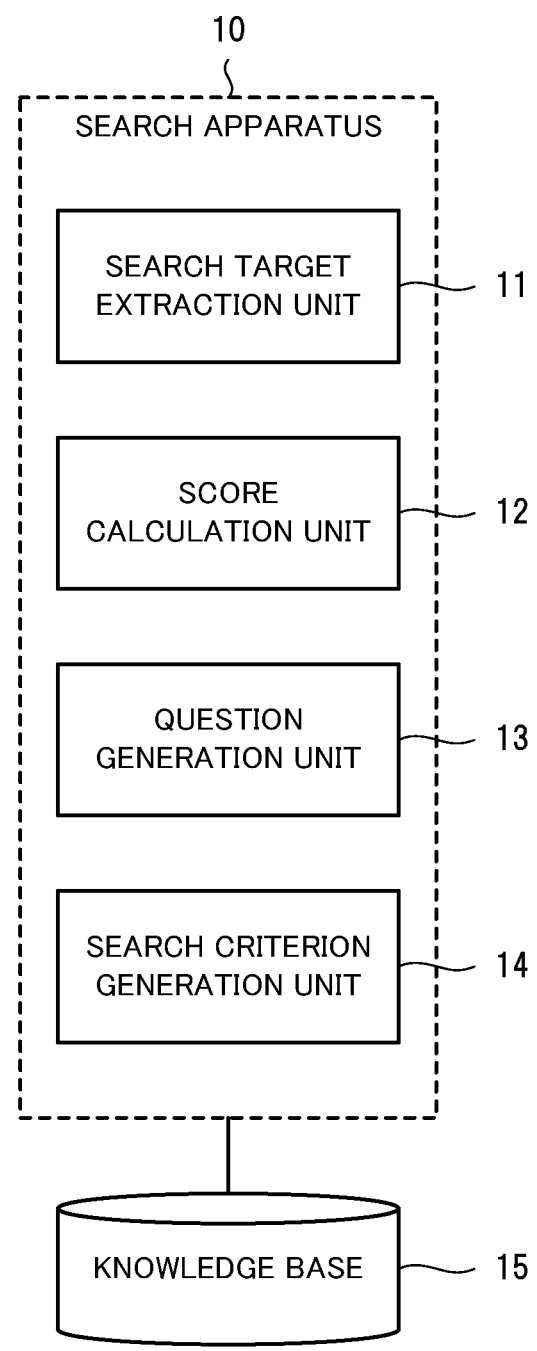
FIG. 1 is a diagram showing an example of the search apparatus.

The following describes an example embodiment with reference to the drawings. Note that in the drawings to be described below, the elements that have the same function or corresponding functions are given the same reference numeral, and a repeated description thereof may be omitted.

Example Embodiment

A configuration of a search apparatus 10 according to an example embodiment will be described using FIG. 1. FIG. 1 is a diagram showing an example of the search apparatus.

[Apparatus Configuration]

The search apparatus 10 shown in FIG. 1 can obtain a search result efficiently by updating a search criterion based on a user's response to a question. Also, as shown in FIG. 1, the search apparatus 10 includes a search target extraction unit 11, a score calculation unit 12, a question generation unit 13, and a search criterion generation unit 14. Furthermore, the search apparatus 10 is connected to a knowledge base 15 via a network or the like.

With use of a search criterion that includes one or more attribute information pieces, the search target extraction unit 11 references a data set that includes search target information pieces in which images and one or more attribute information pieces are associated, and extracts search target information pieces that include an attribute information piece(s) that matches the attribute information piece(s) of the search criterion.

A description is now given of a case where images are to be extracted. The search target extraction unit 11 extracts the images based on the search criterion. The images may be, for example, images that have captured a person or an object and the like. The images may be still images or moving images. Examples of a still image include a painting, a graphic, a clip art, an illustration, and the like, whereas examples of moving images include a video footage, an animation, and the like; however, the types of the images are not limited to these. The search criterion includes one or more attribute information pieces that indicate features of the images. In a case where the attribute information pieces indicate features of images that have captured a person (hereinafter referred to as portrait images), they can be, for example, a sex, an age, an outfit color, eyeglasses, and so forth.

In a case where portrait images are to be extracted with a search criterion that includes a sex, an age, an outfit color, and eyeglasses as attribute information pieces, the search target extraction unit 11 references one or more attribute information pieces associated with each portrait image with use of the sex, age, outfit color, and eyeglasses, and extracts portrait images that include the sex, age, outfit color, and eyeglasses as attribute information pieces.

Figure 2:
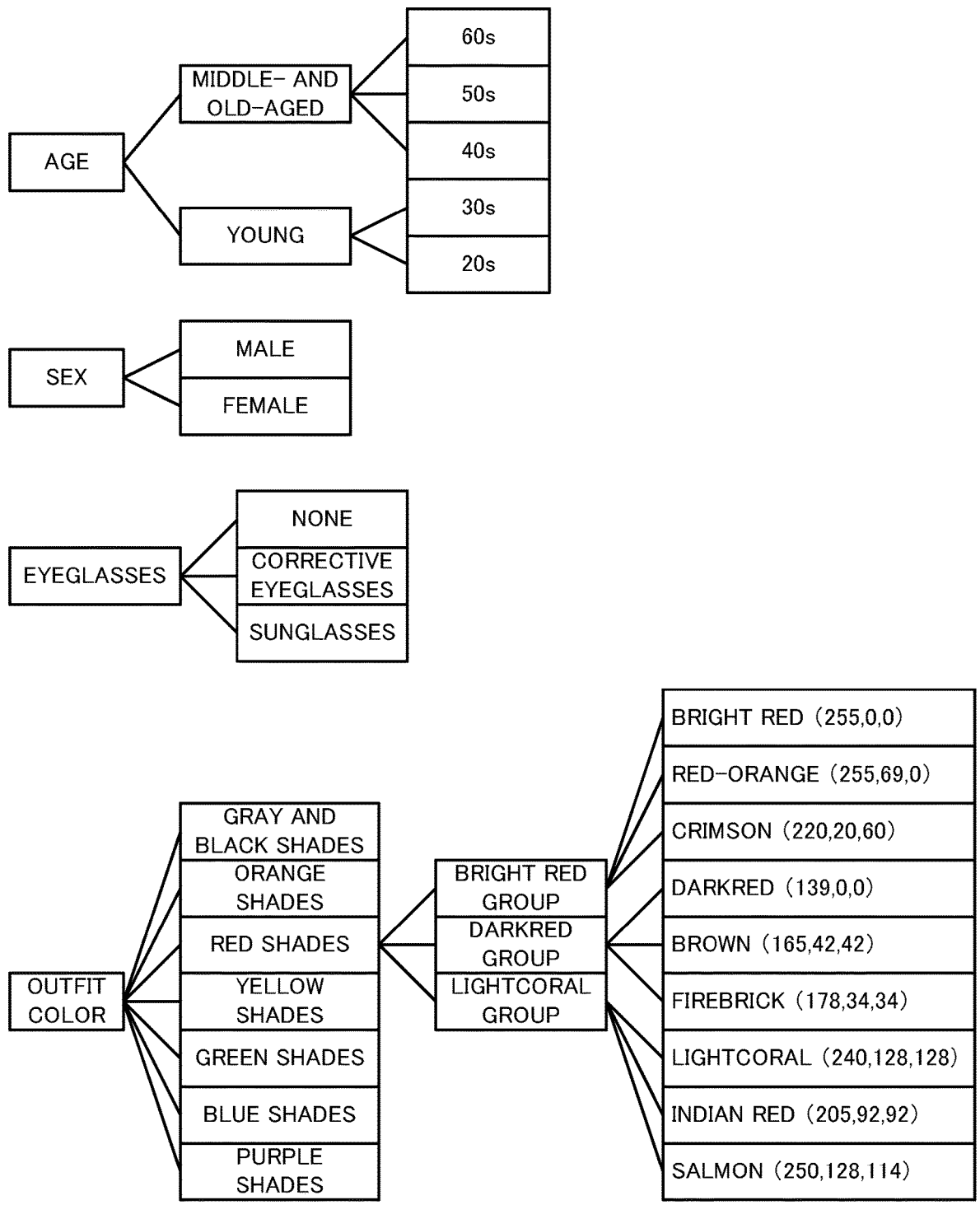
FIG. 2 is a diagram for describing an example of the knowledge base.

The attribute information pieces associated with each portrait image are classified hierarchically. The attribute information pieces are hierarchized as in the knowledge base shown in FIG. 2. FIG. 2 is a diagram for describing an example of the knowledge base. The details of the knowledge base will be described later.

Figure 3:
FIG. 3 is a diagram for describing the relationship between the search target information pieces and the attribute information pieces.
Figure 3:
Figure 3:
Figure 3:
Figure 3:
Figure 3:
Figure 3:
Figure 3:
Figure 3:

As shown in FIG. 3, the data set includes search target information pieces in which a person ID, one or more attribute information pieces, and a portrait image are associated. FIG. 3 is a diagram for describing the relationship between the search target information pieces and the attribute information pieces. The data set of FIG. 3 includes nine search target information pieces.

The knowledge base is now described. In the knowledge base of FIG. 2, the age, sex, eyeglasses, and outfit color, which are the attribute information pieces, are classified hierarchically. Age includes attribute information pieces indicating middle- and old-aged and young in a layer therebelow. Middle- and old-aged includes attribute information pieces indicating 40s, 50s, and 60s in a layer therebelow. Young includes attribute information pieces indicating 20s and 30s in a layer therebelow.

Sex includes attribute information pieces indicating male and female in a layer therebelow. Eyeglasses includes attribute information pieces indicating none (indicating a state where eyeglasses are not worn), corrective eyeglasses (indicating that eyeglasses for vision correction are worn), and sunglasses (indicating that sunglasses are worn) in a layer therebelow.

Outfit color includes attribute information pieces indicating gray and black shades, orange shades, red shades, yellow shades, green shades, blue shades, and purple shades in a layer therebelow. Red shades includes attribute information pieces indicating a bright red group, a darkred group, and a lightcoral group in a layer therebelow.

The bright red group includes attribute information pieces indicating bright red (255, 0, 0), red-orange (255, 69, 0), and crimson (220, 20, 60) in a layer therebelow. The darkred group includes attribute information pieces indicating darkred (139, 0, 0), brown (165, 42, 42), and firebrick (178, 34, 34) in a layer therebelow. The lightcoral group includes attribute information pieces indicating lightcoral (240, 128, 128), Indian red (205, 92, 92), and salmon (250, 128, 114) in a layer therebelow. Three numerical values in a parenthesis denote RGB values.

Note that the structure of the knowledge base is not limited to the structure shown in FIG. 2. Note that although the knowledge base 15 is provided outside the search apparatus 10 in the example of FIG. 1, it may be provided inside the search apparatus 10.

In a case where the number of the extracted search target information pieces is not included in a preset search result range, the score calculation unit 12 references the knowledge base 15 in which the attribute information pieces are classified hierarchically, and calculates a score for each of the attribute information pieces included in the extracted search target information pieces with use of a score function that has been determined in advance.

The search result range is set in advance by the user. The search result range is information indicating the range of the number of search target information pieces obtained through the extraction, which is desired by the user. The score function is a reduction score function or an increase score function.

The reduction score function is a function that is used to reduce the number of search target information pieces in a case where the number of the search target information pieces obtained through the extraction is larger than the search result range. With respect to an attribute information piece that includes an attribute information piece (a leaf node) in a layer (level) therebelow, the score calculation unit 12 calculates a score using the reduction score function.

The reduction score function is, for example, Math. 1 or the like.

$$S1(i) = (w1 \times f1i(o)) + (w2 \times f2i(d)) + (w3 \times f3i(r)) \quad \text{(Math. 1)}$$

S1(i): reduced score
i: identifier that identifies attribute information piece
w1: weight coefficient for element function f1i(o)
f1i(o): function for calculating value with respect to the order o of inputting of attribute information piece
w2: weight coefficient for element function f2i(d)
f2i(d): function for calculating value with respect to distance d to leaf node
w3: weight coefficient for element function f3i(r)
f3i(r): function for calculating division ratio r relative to extracted attribute information pieces The increase score function is a function that is used to increase the number of search target information pieces in a case where the number of the search target information pieces obtained through the extraction is smaller than the search result range. With respect to an attribute information piece with an attribute information piece (node) in a higher layer (a higher level), or an attribute information piece (node) in the same layer (the same level), the score calculation unit 12 calculates a score using the increase score function with reference to the knowledge base 15. The increase score function is, for example, Math. 2 or the like.

$$S2(i) = (w1 \times f1i(o)) + (w4 \times f4i(s)) \quad \text{(Math. 2)}$$

S2(i): increased score
w4: weight coefficient for element function f4i(s)

f4i(s): function for calculating value with respect to similarity degree s of attribute information pieces The element function f1i(o) is a function that returns a larger value as the order of inputting of an attribute information piece in the search criterion comes later. The reason why a larger value is returned as the order comes later is because the uncertainty increases as the order of inputting of an attribute information piece comes later, and therefore narrowing is preferred.

The element function f1i(o) is, for example, Math. 3 or the like.

$$f1i(o) = 1 - 1/(o+1) \quad \text{(Math. 3)}$$

o: order of inputting of attribute information piece

For example, in a case where attribute information pieces have been input in the order of male, 30s, and red, as male has been input first, o=1 is set therefor. As 30s has been input second, o=2 is set therefor. As red has been input third, o=3 is set therefor. Also, as eyeglasses has not been input, o=4 (or ∞) is set therefor.

Then, using the element function f1i(o), a value is calculated for each attribute information piece. As a result of the calculation, ½, ⅔, ¾, and ⅘ (or ≈1) are obtained for male, 30s, red, and eyeglasses, respectively.

The weight coefficient w1 is a value that is larger than 0 and is equal to or smaller than 1. Note that the weight coefficient w1 for the element function f1i(o) is determined through an experiment, a simulation, or the like.

The element function f2i(d) is a function for calculating a value with respect to a distance from a node to a leaf node in the knowledge base 15. The longer the distance between a node corresponding to an attribute information piece to a leaf node, the greater the ambiguity, and thus the higher the possibility of narrowing. The function f2i(d) is, for example, Math. 4 or the like.

$$f2i(d) = 1 - 1/(d+1) \quad \text{(Math. 4)}$$

d: distance between node and leaf node

For example, in a case where attribute information pieces are male, 30s, red, and eyeglasses, as male includes no leaf node in a layer therebelow in the knowledge base of FIG. 2, d=0 is set therefor. As 30s, too, includes no leaf node in a layer therebelow, d=0 is set therefor. As red includes leaf nodes two layers down, d=2 is set therefor. Also, as eyeglasses includes leaf nodes one layer down, d=1 is set therefor.

Then, using the element function f2i(d), a value is calculated for each attribute information piece. As a result of the calculation, 0, 0, ⅔, and ½ are obtained for male, 30s, red, and eyeglasses, respectively.

The weight coefficient w2 is a value that is larger than 0 and is equal to or smaller than 1. Note that the weight coefficient w2 for the element function f2i(d) is determined through an experiment, a simulation, or the like.

The element function f3i(r) is a function for calculating a division ratio r relative to the extracted attribute information pieces. The extracted search target information pieces are divided as evenly as possible using attribute information pieces in lower layers. The more evenly the division is made, the higher the narrowing performance becomes. The function f3i(r) is, for example, Math. 5 or the like.

$$f3i(r) = r = 1 - \Sigma_{j=1}^{k} |r_j - s_j| \quad \text{[Math. 5]}$$

k: number of divided groups
$r_j$: proportion of the number of data pieces in group j to the total number $s_j$: standard proportion of the number of data pieces in group j to the total number, in the case of standard division For example, the extracted search target information pieces are divided as evenly as possible (standard division). In a case where the nine extracted search target information pieces shown in FIG. 3 are divided into halves, the division results in groups that include five pieces and four pieces, respectively. In contrast, in a case where the nine extracted search target information pieces of FIG. 3 are divided into thirds, the division can be performed evenly with each group including three pieces.

Therefore, as the number of the groups is three, k=3 (j=1, 2, 3). Furthermore, the standard proportions $s_j$ of the respective groups are: $s_1$=3/9, $s_2$=3/9, and $s_3$=3/9.

Next, a description is given of the proportion $r_j$ of the number of search target information pieces in a group to the total number. For example, in a case where an attribute information piece is red shades, red shades includes three attribute information pieces (bright red group, darkred group, and lightcoral group) in a layer therebelow in the knowledge base of FIG. 2.

Bright red group includes three attribute information pieces (bright red, red-orange, and crimson) in a layer therebelow. Darkred group includes three attribute information pieces (darkred, brown, and firebrick) in a layer therebelow. Lightcoral group includes three attribute information pieces (lightcoral, Indian red, and salmon) in a layer therebelow.

As bright red and crimson, which are in the layer below bright red group, are associated with the search target information pieces associated with person IDs 1 and 2, the proportion $r_1$ of bright red group to the total number is 2/9. As darkred, brown, and firebrick, which are in the layer below darkred group, are associated with the search target information pieces associated with person IDs 3, 4, 5, and 6, the proportion $r_2$ of darkred group to the total number is 4/9. As lightcoral and salmon, which as in the layer below lightcoral group, are associated with the search target information pieces associated with person IDs 7, 8, and 9, the proportion $r_3$ of lightcoral group to the total number is 3/9. Therefore, in a case where an attribute information piece is red shades, the element function f3i(r) is Math. 6.

$$f3i(r) = r = 1 - \left(\left|\frac{4}{9} - \frac{3}{9}\right| + \left|\frac{3}{9} - \frac{3}{9}\right| + \left|\frac{2}{9} - \frac{3}{9}\right|\right) = 7/9 \quad \text{[Math. 6]}$$

i: attribute information piece is red shades

Furthermore, in a case where an attribute information piece is eyeglasses, the element function f3i(r) is Math. 7.

$$f3i(r) = r = 1 - \left(\left|\frac{6}{9} - \frac{3}{9}\right| + \left|\frac{2}{9} - \frac{3}{9}\right| + \left|\frac{1}{9} - \frac{3}{9}\right|\right) = 3/9 \quad \text{[Math. 7]}$$

i: attribute information piece is eyeglasses

The weight coefficient w3 is a value that is larger than 0 and is equal to or smaller than 1. Note that the weight coefficient w3 for the element function f3i(r) is determined through an experiment, a simulation, or the like.

According to the element function f4i(s), first, similarity degrees are calculated by combining the attribute information pieces in the search criterion and attribute information pieces in nodes of a level higher than or equal to the attribute information pieces in the search criterion, and the largest value among the calculated similarity degrees is used as a similarity degree s. The higher the similarity between attribute information pieces, the higher the possibility that the user responds by selecting similar attribute information pieces. The function f4i(s) is, for example, Math. 8 or the like.

$$f4i(s) = s = \max \text{Sim}(a_n, a_m) \quad \text{(Math. 8)}$$

n, m: identifier that identifies attribute information piece $a_n$: attribute information piece in search criterion $a_m$: attribute information piece in nodes of a level higher than or equal to attribute information piece in search criterion Sim ($a_n$, $a_i$): function for calculating similarity degree of attribute information pieces (e.g., cosine function)

The similarity degrees of combinations are calculated, for example, as follows: Sim (male, 40s)=0, Sim (30s, 40s)=0.8, Sim (red, 40s)=0, Sim (male, female)=0.2, Sim (30s, female)= 0, Sim (red, female)=0.3, . . . .

Next, the highest similarity degree is obtained for each attribute information piece. When an attribute information piece is 40s, max {0, 0.8, 0}=0.8=f4i (0.8). Also, when an attribute information piece is female, max {0.2, 0, 0.3}=0.3=f4i (0.3).

The weight coefficient w4 is a value that is larger than 0 and is equal to or smaller than 1. Note that the weight coefficient w4 for the element function f4i(s) is determined through an experiment, a simulation, or the like.

The question generation unit 13 selects an attribute information piece based on the calculated scores, and generates question information indicating a question to be presented to the user with use of the selected attribute information piece. Specifically, first, the question generation unit 13 compares the scores that have been calculated for the respective attribute information pieces, and selects an attribute information piece corresponding to the score with the largest value. Next, the question generation unit 13 generates question information indicating a question to be presented to the user with use of the selected attribute information piece.

The search criterion generation unit 14 reflects an attribute information piece included in a user's response to the question information in the search criterion, thereby generating a new search criterion.

As described above, in the example embodiment, a search criterion is updated based on a user's response to a question, and a search is performed using the updated search information; as a result, a search result can be obtained efficiently.

[System Configuration]

Figure 4:
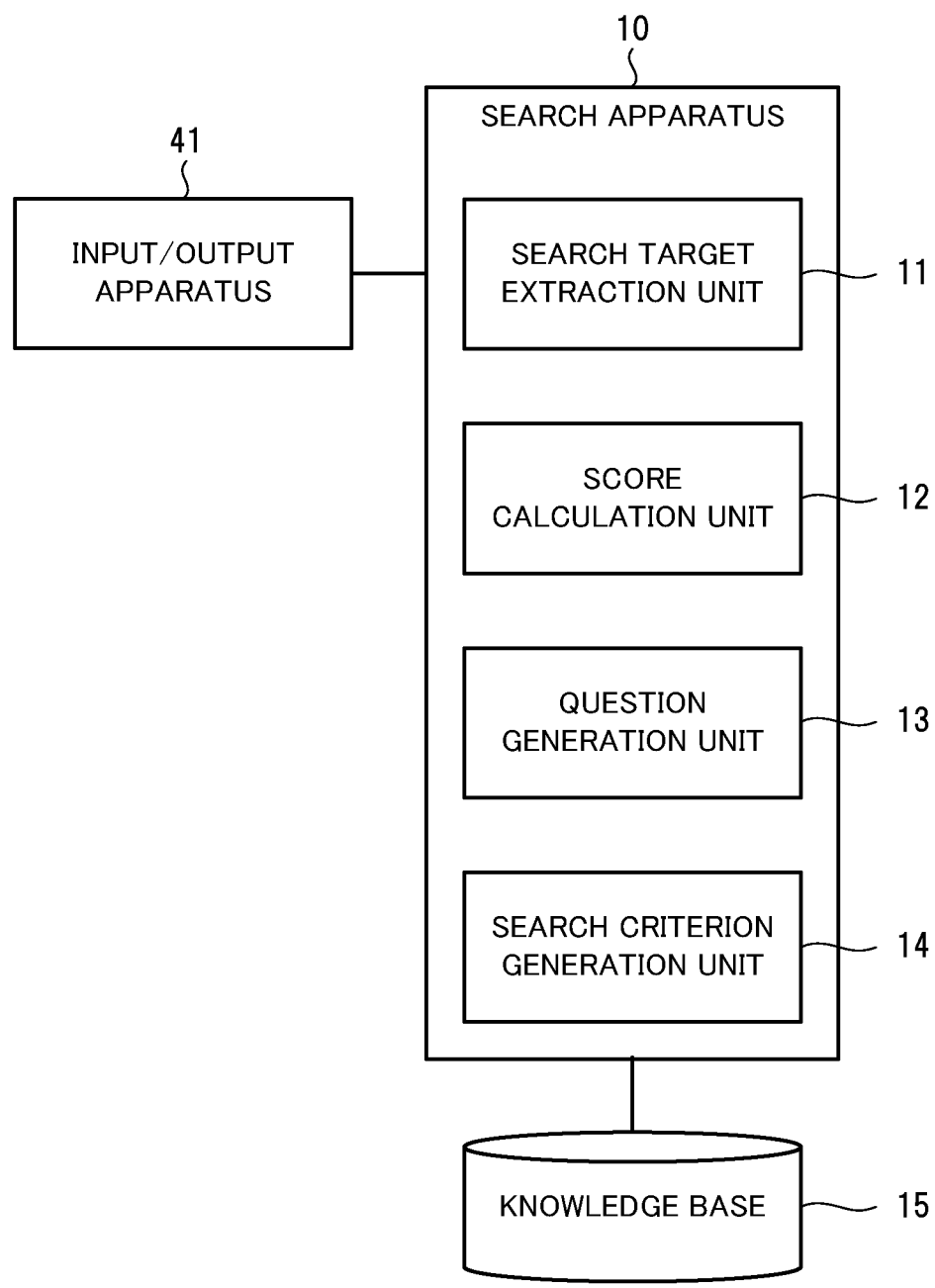
FIG. 4 is a diagram showing an example of a system including the search apparatus.

The configuration of the search apparatus 10 according to the example embodiment will be described more specifically using FIG. 4. FIG. 4 is a diagram showing an example of a system including the search apparatus.

As shown in FIG. 4, a system 40 according to the example embodiment includes the search apparatus 10, the knowledge base 15, and an input/output apparatus 41.

The search apparatus 10 is, for example, an information processing apparatus such as a central processing unit (CPU), a programmable device like a field-programmable gate array (FPGA), a graphics processing unit (GPU), a circuit equipped with one or more of these, a server computer, a personal computer, and a mobile terminal.

The input/output apparatus 41 includes a user interface, and includes an input unit via which a user inputs information and an output unit that outputs images, sounds, and the like to the user. The input unit is, for example, an input device that includes a keyboard, a mouse, a touch panel, and the like. The output unit is, for example, an image display device or the like that uses liquid crystals, organic electro luminescence (EL) cathode ray tubes (CRT), and so forth. Furthermore, the image display device may include, for example, a sound output device, such as a speaker. Note that the output unit may be a printing device, such as a printer.

As the search target extraction unit 11, score calculation unit 12, question generation unit 13, search criterion generation unit 14, and knowledge base 15 included in the search apparatus 10 have already been described, a description thereof is omitted.

[Apparatus Operations]

Figure 5:
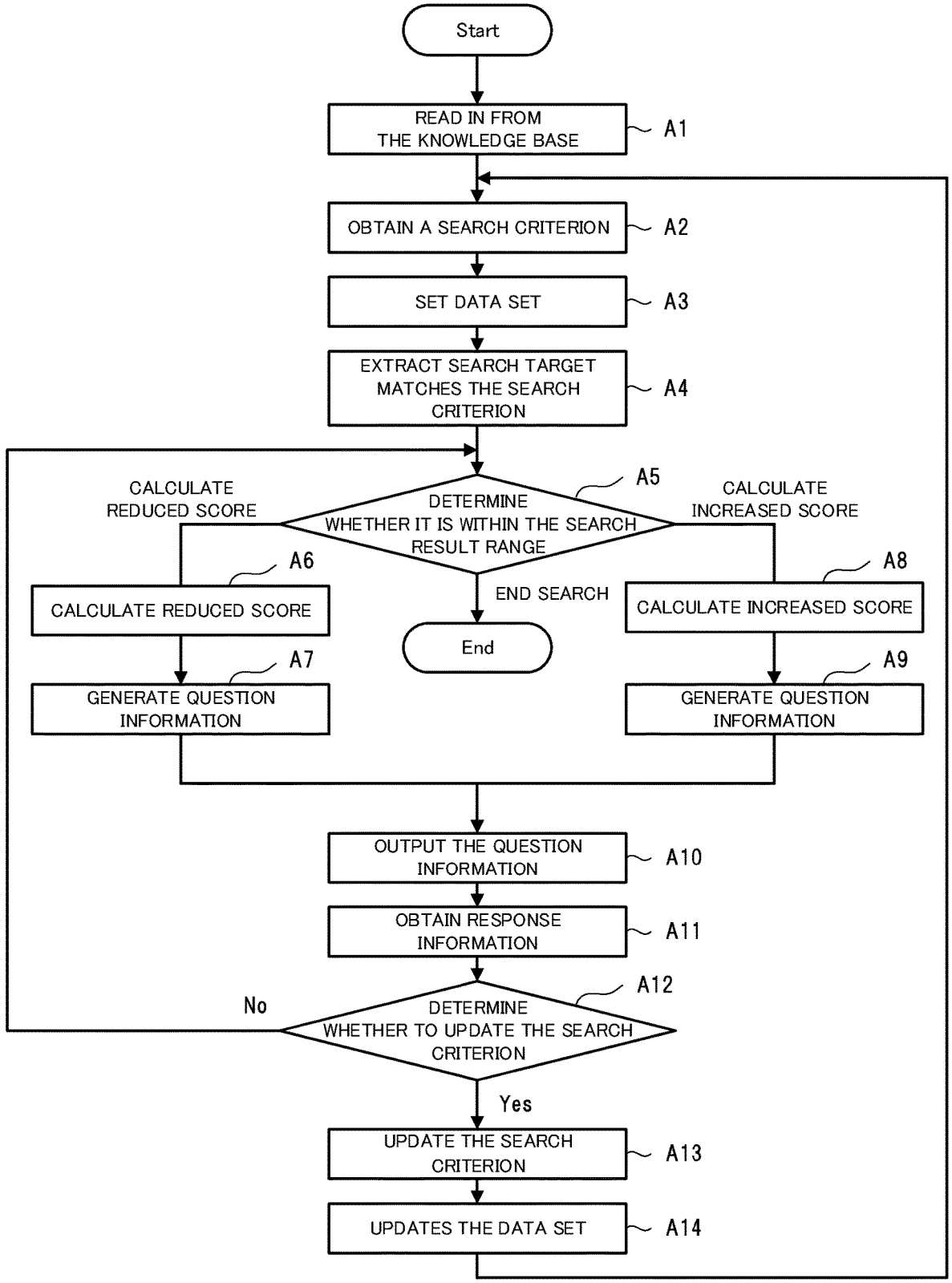
FIG. 5 is a diagram for describing exemplary operations of the search apparatus.

The operations of the search apparatus according to the example embodiment will be described using FIG. 5. FIG. 5 is a diagram for describing exemplary operations of the search apparatus. In the following description, the drawings will be referenced as appropriate. Also, in the example embodiment, a search method is implemented by causing the search apparatus to operate. Therefore, the following description of the operations of the search apparatus also applies to the search method according to the example embodiment.

First, data is read in from the knowledge base 15 (step A1). Next, the search target extraction unit 11 obtains an initial search criterion at the start of a search (step A2). Specifically, in step A2 at the start of the search, document information and the like generated by the user is analyzed using, for example, a known document analysis tool, and attribute information pieces of the search criterion are obtained. For example, a document indicating "the sex is male, the age is around 30s, and the outfit color is red" is obtained, this document is analyzed, and the following are obtained as the attribute information pieces of the search criterion: sex: male, age: 30s, outfit color: red.

Furthermore, in step A2 after the search criterion has been updated, the search target extraction unit 11 obtains updated search information.

Next, with use of the attribute information pieces of the search criterion, the search target extraction unit 11 references the attribute information pieces associated with search target information pieces, extracts search target information pieces that match one or more of the attribute information pieces of the search criterion, and sets these search target information pieces (data set) (step A3).

Next, with use of the search criterion that includes one or more attribute information pieces, the search target extraction unit 11 references the data set that includes search target information pieces in which images and the one or more attribute information pieces are associated, and extracts search target information pieces that include an attribute information piece(s) that matches the attribute information piece(s) of the search criterion (step A4).

The score calculation unit 12 determines whether the number of the search target information pieces is within a preset search result range (step A5). In a case where the number of the search target information pieces is not within the search result range, the knowledge base in which the attribute information pieces are classified hierarchically is referenced, and a score is calculated for each of the attribute information pieces included in the extracted search target information pieces with use of a score function that has been determined in advance.

Specifically, in a case where the number of the search target information pieces obtained through the extraction is larger than the search result range (step A5: calculate reduced score), the score calculation unit 12 calculates scores using the reduction score function with respect to attribute information pieces that include an attribute information (a leaf node) in a layer (level) therebelow (step A6). The reduction score function is, for example, Math. 1 or the like.

Next, the question generation unit 13 selects an attribute information piece based on the calculated scores, and generates question information indicating a question to be presented to the user with use of the selected attribute information piece (step A7). Specifically, in step A7, the question generation unit 13 compares the scores that have been calculated for the respective attribute information pieces in step A6, and selects an attribute information piece corresponding to the score with the largest value. Next, the question generation unit 13 generates question information indicating a question to be presented to the user with use of the selected attribute information piece.

Also, in a case where the number of the search target information pieces obtained through the extraction is smaller than the search result range (step A5: calculate increased score), the score calculation unit 12 calculates scores using the increase score function with respect to attribute information pieces with attribute information pieces (nodes) in a higher layer (a higher level), or attribute information pieces (nodes) in the same layer (the same level) (step A8). The increase score function is, for example, Math. 2 or the like.

Next, the question generation unit 13 selects an attribute information piece based on the calculated scores, and generates question information indicating a question to be presented to the user with use of the selected attribute information piece (step A9). Specifically, in step A9, the question generation unit 13 compares the scores that have been calculated for the respective attribute information pieces in step A8, and selects an attribute information piece corresponding to the score with the largest value. Next, the question generation unit 13 generates question information indicating a question to be presented to the user with use of the selected attribute information piece.

Next, the question generation unit 13 outputs the question information to the input/output apparatus 41 (step A10). Next, the search criterion generation unit 14 obtains response information indicating a user's response to the question information (step A11).

Next, the search criterion generation unit 14 determines whether to update the search criterion (step A12). In a case where the search criterion is to be updated (step A12: Yes), the search criterion generation unit 14 reflects an attribute information piece in the search criterion, thereby generating a new search criterion (step A13). In a case where the search criterion is not to be updated (step A12: No), a transition is made to step A5, and question information is generated again.

Next, the search criterion generation unit 14 updates the data set (step A14). Specifically, in step A14, the search criterion generation unit 14 extracts search target information pieces that include the attribute information used in the update of the search criterion, and uses the extracted search target information pieces as a new data set.

Thereafter, a transition is made to processing of step A2, and the search is continued using the updated search criterion and the updated data set. Then, if the number of the extracted search target information pieces is within the search result range, search processing is ended (step A5: end search).

Effects of Embodiment

As described above, according to the example embodiment, a search criterion is updated based on a user's response to a question, and a search is performed using the updated search information; accordingly, a search result can be obtained efficiently. The response to the question and the update of the search criterion also enable the user to grasp attribute information pieces of a search target in a more accurate way.

[Program]

The program according to an embodiment may be a program that causes a computer to execute steps A1 to A14 shown in FIG. 5. By installing this program in a computer and executing the program, the search apparatus and the search method according to the example embodiment can be realized. In this case, the processor of the computer performs processing to function as the search target extraction unit 11, the score calculation unit 12, the question generation unit 13, and the search criterion generation unit 14.

Also, the program according to the present embodiment may be executed by a computer system constructed by a plurality of computers. In this case, for example, each computer may function as any of the search target extraction unit 11, the score calculation unit 12, the question generation unit 13, and the search criterion generation unit 14.

[Physical Configuration]

Figure 6:
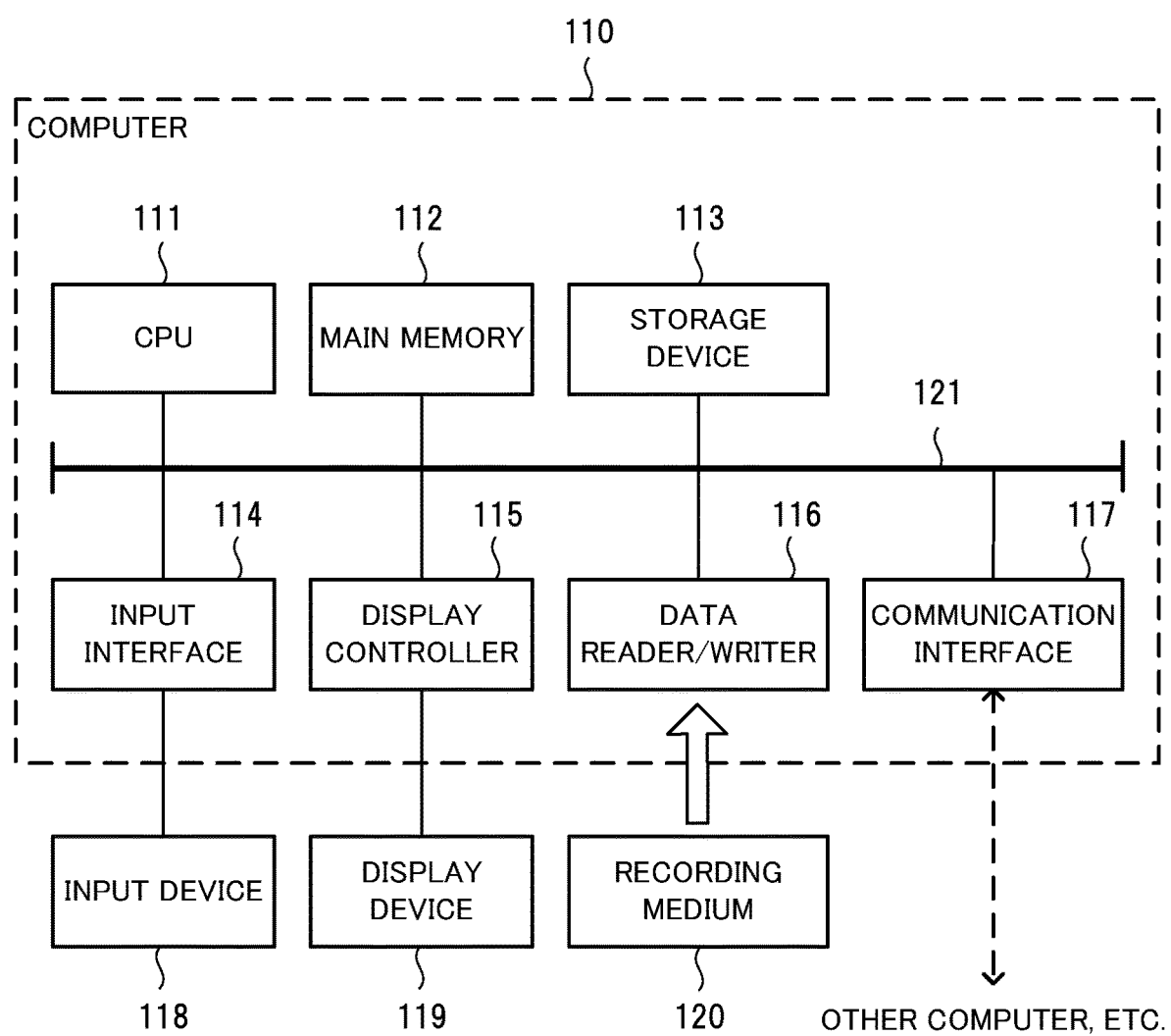
FIG. 6 is a diagram showing an example of a computer that realizes the search apparatus according to an example embodiment.

Here, a computer that realizes a search support apparatus by executing the program according to an example embodiment will be described with reference to FIG. 6. FIG. 6 is a diagram showing an example of a computer that realizes the search apparatus according to an example embodiment.

As shown in FIG. 10, a computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU or an FPGA in addition to the CPU 111 or in place of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state being stored in a computer-readable recording medium 120. Note that the program according to this example embodiment may be distributed on the Internet, which is connected through the communications interface 117. Note that the recording medium 120 is a non-volatile recording medium.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the search apparatus 10 according to this example embodiment can also be realized by using hardware corresponding to each unit. Furthermore, a portion of the search apparatus 10 may be realized by a program, and the remaining portion realized by hardware.

EXAMPLE

A example will be described in relation to a case where a portrait image is to be searched for. In the example, it is assumed that one or more and two or less are set as the search result range.

The search target extraction unit 11 obtains a search criterion (step A2). For example, the following are obtained as attribute information pieces of the search criterion: sex: male, age: 30s, outfit color: red.

Next, while using male, 30s, and red as the attribute information pieces of the search criterion, the search target extraction unit 11 references the attribute information pieces of each search target information piece in a data set, and extracts search target information pieces that include attribute information pieces that match the attribute information pieces of the search criterion (step A4). In the example, it is assumed that the search target information pieces shown in FIG. 3 have been extracted.

Specifically, the search target information pieces that match the search criterion (male, 30s, red) are extracted from among the search target information pieces shown in FIG. 3. In the example, the search target information pieces corresponding to portrait image IDs 1, 2, and 7 are selected. Also, the number of the extracted search target information pieces is three.

Next, the score calculation unit 12 determines whether the number of the extracted search target information pieces is within the search result range (step A5). The number of the extracted search target information pieces is 3, which is larger than 2 set as the search result range (3>2).

Therefore, reduced scores are calculated (step A5: calculate reduced score).

Next, the score calculation unit 12 references the knowledge base 15, and calculates reduced scores for attribute information pieces in lower-level nodes (step A6).

For example, the scores indicated by Math. 10 are calculated with respect to the discrete attribute information pieces with use of a reduction score function $S1(i)$ of Math. 9.

$$S1(i)=(0.3 \times f1i(o))+(0.3 \times f2i(d))+(0.4 \times f3i(r)) \qquad \text{(Math. 9)}$$

$$S1(\text{red})=0.3 \times 3/4+0.3 \times 2/3+0.4 \times 7/9 \leqq 0.726$$

$$S1(\text{eyeglasses})=0.3 \times 1+0.3 \times 1/2+0.4 \times 3/8 \leqq 0.583 \qquad \text{(Math. 10)}$$

Next, the question generation unit 13 selects an attribute information piece with the highest score among the calculated scores. As the score for red is the highest according to Math. 10, the attribute information piece indicating red is selected.

Next, the question generation unit 13 obtains the attribute information pieces indicating bright red group, darkred group, and lightcoral group, which are in a layer below the attribute information piece indicating red. Then, the question generation unit 13 generates question information to be presented to the user and displayed on the output unit, such as "which one of these red colors is close: bright red group, darkred group, or lightcoral group?", for example (step A7).

Figure 7:
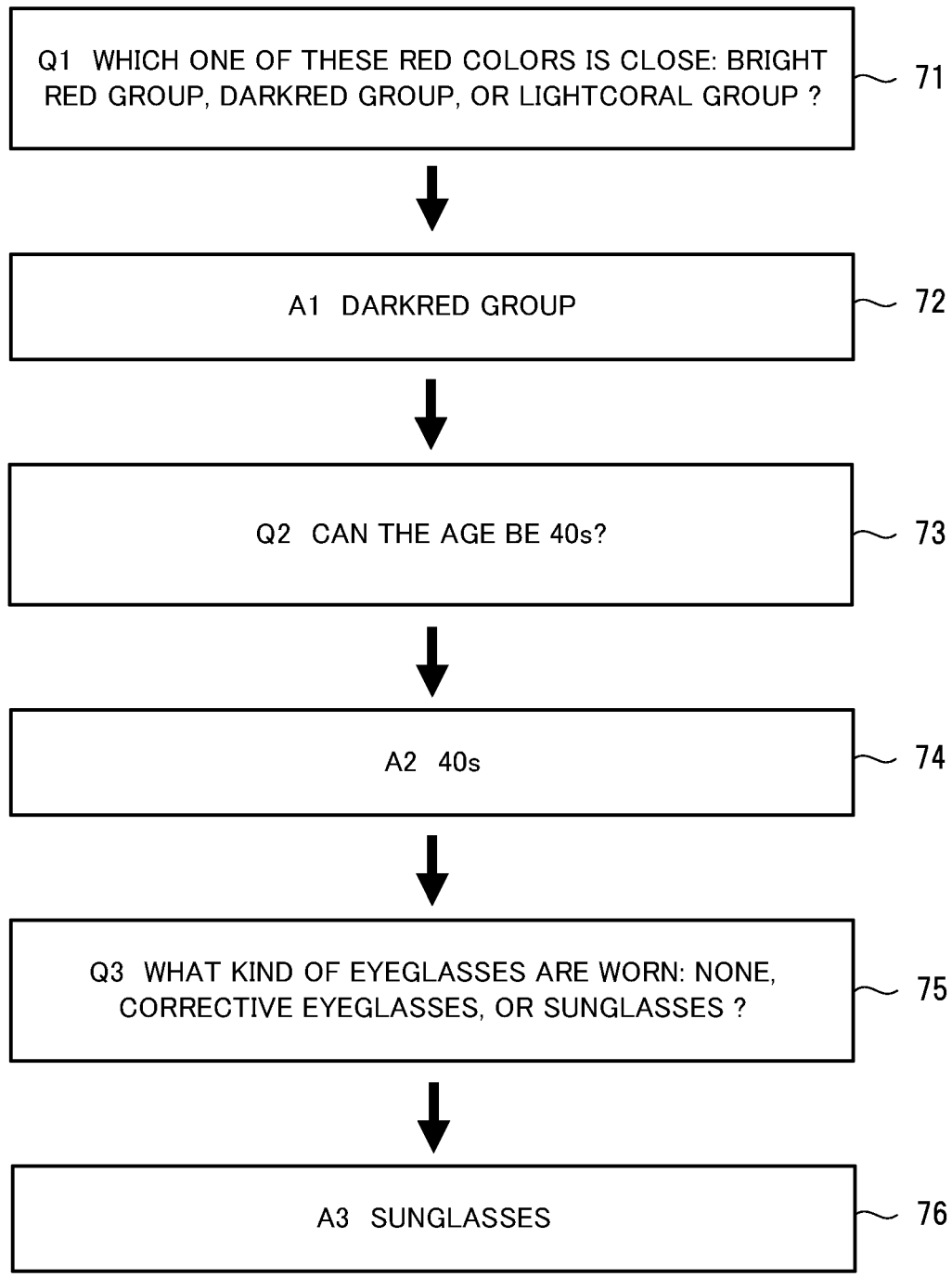
FIG. 7 is a diagram for describing questions and responses.

Next, the question generation unit 13 presents a question to the user by outputting the question information to an output apparatus (step A10). The question is displayed as indicated by a question display 71 of FIG. 7. Note that no limitation is intended by the question display 71. FIG. 7 is a diagram for describing questions and responses.

Next, the search criterion generation unit 14 obtains response information indicating a user's response to the question information (step A11). In the example, it is assumed that the user has made a response indicating darkred group. The response is displayed as indicated by a response display 72 of FIG. 7. Note that no limitation is intended by the response display 72.

Next, the search criterion generation unit 14 determines whether to update the search criterion (step A12). Then, in a case where the search criterion is to be updated (step A12: Yes), the search criterion generation unit 14 updates red in the search criterion to darkred (step A13). Note that in a case where the search criterion is not to be updated (step A12: No), a transition is made to step A5, question information is generated again, and a question is presented.

Figure 8:
FIG. 8 is a diagram for describing the relationship between the search target information pieces and the attribute information pieces.
Figure 8:
Figure 8:
Figure 8:

Next, the search criterion generation unit 14 updates the data set (step A14). In the example, the search target information pieces that do not include darkred are excluded. As shown in FIG. 8, the resultant data set includes only the search target information pieces corresponding to person IDs 3 to 6 as shown in FIG. 8.

Next, a transition is made to step A2, and the search target extraction unit 11 obtains the updated search criterion. The following are obtained as the attribute information pieces of the updated search criterion: sex: male, age: 30s, outfit color: darkred.

Next, the search target extraction unit 11 sets the updated data set (step A3). Next, the search target extraction unit 11 extracts, from the updated data set, the search target information pieces that include attribute information pieces that match the updated search criterion (male, 30s, darkred) (step A4). However, as no search target information piece is extracted, the number of extracted search target information pieces is 0.

Next, the score calculation unit 12 determines whether the number of the extracted search target information pieces is within the search result range (step A5). The number of the extracted search target information pieces is 0, which is smaller than 1 set as the search result range (0<1); therefore, increased scores are calculated (step A5: calculate increased score).

Next, the score calculation unit 12 references the knowledge base 15, and calculates increased scores for attribute information pieces in nodes of a higher level or the same level (step A8).

For example, the scores are calculated with respect to the discrete attribute information pieces with use of an increase score function $S2(i)$ of Math. 11.

$$S2(i)=(0.5 \times f1i(o))+(0.5 \times f4i(s))$$ (Math. 11)

First, with regard to the element function $f1i(o)$, as male has been input first, the element function for male is $f1i(1)=\frac{1}{2}$. Also, as 30s has been input second, the element function for 30s is $f1i(2)=\frac{2}{3}$.

Next, the element function $f4i(s)$ is calculated. Similarity degrees are calculated by combining the attribute information pieces in the search criterion and attribute information pieces in nodes of a level higher than or equal to the attribute information pieces in the search criterion. The similarity degrees are as follows: Sim (male, female)=0.2, Sim (30s, female)=0, Sim (male, 40s)=0, Sim (30s, 40s)=0.8.

Next, the largest value of the similarity degrees for female in the same level as male (female increased in connection with male) is 0.2, whereas the largest value of the similarity degrees for 40s in the same level as 30s (40s increased in connection with 30s) is 0.8.

Next, with use of the results of calculations of the element functions $f1i(o)$ and $f4i(s)$, an increase score function $S2(i)$ is calculated for each attribute information piece as indicated by Math. 12.

$$S2(female)=0.5\times\frac{1}{2}+0.5\times0.2=0.35$$

$$S2(40s)=0.5\times\frac{2}{3}+0.5\times0.8 \leq 0.743$$ (Math. 12)

Next, the question generation unit 13 selects an attribute information piece with the highest score among the calculated scores. As the score for 40s is the highest according to Math. 12, the attribute information piece indicating 40s is selected.

Next, the question generation unit 13 obtains the attribute information piece indicating 40s. Then, the question generation unit 13 generates question information to be presented to the user, such as "can the age be 40s?", for example (step A9).

Next, the question generation unit 13 presents a question to the user by outputting the question information to the output apparatus (step A10). The question is displayed as indicated by a question display 73 of FIG. 7. Note that no limitation is intended by the question display 73.

Next, the search criterion generation unit 14 obtains response information indicating a user's response to the question information (step A11). In the example, it is assumed that the user has made a response indicating 40s. The response is displayed as indicated by a response display 74 of FIG. 7. Note that no limitation is intended by the response display 74.

Next, the search criterion generation unit 14 determines whether to update the search criterion (step A12). Then, in a case where the search criterion is to be updated (step A12: Yes), the search criterion generation unit 14 updates the search criterion by adding 40s thereto (step A13). Note that in a case where the search criterion is not to be updated (step A12: No), a transition is made to step A5, and a question is presented again.

Next, the search criterion generation unit 14 updates the data set (step A14). In the example, the search target information piece indicating 40s is added. Note that as 40s is already included, no update is made.

Next, a transition is made to step A2, and the search target extraction unit 11 obtains the updated search criterion. For example, the following are obtained as attribute information pieces of the updated search criterion: sex: male, age: 30s or 40s, outfit color: darkred.

Next, the search target extraction unit 11 sets a data set (step A3). Next, the search target extraction unit 11 extracts, from the data set, the search target information pieces that match the search criterion (male, 30s or 40s, darkred) (step A4). In the example, portrait image IDs 4, 5, and 6 are selected. Also, the number of the extracted search target information pieces is three.

Next, the score calculation unit 12 determines whether the number of the extracted search target information pieces is within the search result range (step A5). The number of the extracted search target information pieces is 3, which is larger than 2 set as the search result range (3>2). Therefore, reduced scores are calculated (step A5: calculate reduced score).

Next, the score calculation unit 12 references the knowledge base 15, and calculates reduced scores for attributes in lower-level nodes (step A6).

The scores are calculated with respect to the discrete attribute information pieces with use of the reduction score function S1(i) of Math. 9. As the attribute information pieces in lower-level nodes are darkred and eyeglasses, the element function f1i(o) is calculated for each of darkred and eyeglasses. As darkred has been input third, f1i(3)=¾. As eyeglasses has not been input, f1i(4 or ∞)=1.

Next, the element function f2i(d) is calculated for each of darkred and eyeglasses. As darkred shades includes leaf nodes one layer down, f2i(1)=½. As eyeglasses also includes leaf nodes one layer down, f2i(1)=½.

Next, the element function f3i(r) is calculated for each of darkred and eyeglasses. In the example, the number of data pieces is 4, the number of lower-level nodes is 3, and the standard division is 2, 1, 1; thus, the element function f3i(r) for each of darkred and eyeglasses is as indicated by Math. 13.

$$f3i(r) \text{ of darkred} = 1 - \left(\left|\frac{2}{4} - \frac{2}{4}\right| + \left|\frac{1}{4} - \frac{1}{4}\right| + \left|\frac{1}{4} - \frac{1}{4}\right|\right) = 1 \quad \text{[Math. 13]}$$

$$f3i(r) \text{ of eyeglasses} = 1 - \left(\left|\frac{2}{4} - \frac{2}{4}\right| + \left|\frac{1}{4} - \frac{1}{4}\right| + \left|\frac{1}{4} - \frac{1}{4}\right|\right) = 1$$

Next, with use of the results of calculations of the element functions f1i(o), f2i(d), and f3i(r), the reduction score function S1(i) is calculated for each attribute information piece as indicated by Math. 14.

$$S1(\text{darkred}) = 0.3 \times \tfrac{3}{4} + 0.3 \times \tfrac{1}{2} + 0.4 \times 1 = 0.77$$

$$S1(\text{eyeglasses}) = 0.3 \times 1 + 0.3 \times \tfrac{1}{2} + 0.4 \times 1 = 0.85 \quad (\text{Math. 14})$$

Next, the question generation unit 13 selects an attribute information piece with the highest score among the calculated scores. As the score for eyeglasses is the highest according to Math. 14, the attribute information piece indicating eyeglasses is selected.

Next, the question generation unit 13 obtains the attribute information piece indicating eyeglasses. Then, the question generation unit 13 generates question information to be presented to the user, such as "what kind of eyeglasses are worn: none, corrective eyeglasses, or sunglasses?", for example (step A9).

Next, the question generation unit 13 presents a question to the user by outputting the question information to the output apparatus (step A10). The question is displayed as indicated by a question display 75 of FIG. 7. Note that no limitation is intended by the question display 75.

Next, the search criterion generation unit 14 obtains response information indicating a user's response to the question information (step A11). In the example, it is assumed that the user has made a response indicating sunglasses. The response is displayed as indicated by a response display 76 of FIG. 7. Note that no limitation is intended by the response display 76.

Next, the search criterion generation unit 14 determines whether to update the search criterion (step A12). Then, in a case where the search criterion is to be updated (step A12: Yes), the search criterion generation unit 14 adds sunglasses to the search criterion (step A13). Note that in a case where the search criterion is not to be updated (step A12: No), a transition is made to step A5, question information is generated again, and a question is presented.

Next, the search criterion generation unit 14 updates the data set (step A14). In the example, the search target information pieces that do not include sunglasses are excluded. The resultant data set includes only the search target information piece corresponding to person ID 6 shown in FIG. 8. FIG. 8 is a diagram for describing the relationship between the search target information pieces and the attribute information pieces.

Next, a transition is made to step A2, and the search target extraction unit 11 obtains the updated search criterion. For example, the following are obtained as attribute information pieces of the updated search criterion: sex: male, age: 30s or 40s, outfit color: darkred, eyeglasses: sunglasses.

Next, the search target extraction unit 11 sets a data set (step A3). Next, the search target extraction unit 11 extracts, from the data set, the search target information pieces that match the search criterion (male, 30s or 40s, darkred, sunglasses) (step A4). In the example, portrait image ID 6 is selected. Also, the number of the extracted search target information pieces is one.

Next, the score calculation unit 12 determines whether the number of the extracted search target information pieces is within the search result range (step A5). The number of the extracted search target information pieces is 1 (=x), which is within the search result range (1≤x≤2). Therefore, search processing is ended (step A5: end search).

SUPPLEMENTARY NOTES

Furthermore, the following supplementary notes are disclosed regarding the example embodiments described above. Some portion or all the example embodiments described above can be realized according to (supplementary note 1) to (supplementary note 12) described below, but the below description does not limit.

Supplementary Note 1

A search apparatus, comprising:
a search target extraction unit that references a data set that includes search target information pieces in which an image and one or more attribute information pieces are associated with use of a search criterion that includes one or more attribute information pieces, and extracts search target information pieces that include the attribute information pieces that match the attribute information pieces of the search criterion;
a score calculation unit that, in a case where the number of the extracted search target information pieces is not within a preset search result range, references a knowledge base in which attribute information pieces are classified hierarchically, and calculates a score for each of the attribute information pieces included in the extracted search target information pieces with use of a score function that has been determined in advance;
a question generation unit that selects an attribute information piece based on the calculated scores, and generates question information indicating a question to be presented to a user with use of the selected attribute information piece; and
a search criterion generation unit that reflects an attribute information piece indicated by a response of the user to the question information in the search criterion, thereby generates a new search criterion.

Supplementary Note 2

The search apparatus according to supplementary note 1, wherein in a case where the number of the extracted search target information pieces is smaller than the search result range, the score calculation unit references the knowledge base, and calculates a score for each attribute information piece in a node of a higher level or a node of the same level with use of an increase score function for increasing a search result.

Supplementary Note 3

The search apparatus according to supplementary note 1 or 2, wherein
in a case where the number of the extracted search target information pieces is larger than the search result range, the score calculation means references the knowledge base, and calculates a score for each attribute information piece in a node of a lower level with use of a reduction score function for reducing a search result.

Supplementary Note 4

The search apparatus according to any one of supplementary notes 1 to 3, wherein
the search target information pieces are information pieces in which identification pieces for identifying the search target information pieces, the attribute information pieces, and portrait images related to the search target information pieces are associated.

Supplementary Note 5

A search method, comprising:
referencing a data set that includes search target information pieces in which an image and one or more attribute information pieces are associated with use of a search criterion that includes one or more attribute information pieces, and extracting search target information pieces that include the attribute information pieces that match the attribute information pieces of the search criterion;
in a case where the number of the extracted search target information pieces is not within a preset search result range, referencing a knowledge base in which attribute information pieces are classified hierarchically, and calculating a score for each of the attribute information pieces included in the extracted search target information pieces with use of a score function that has been determined in advance;
selecting an attribute information piece based on the calculated scores, and generating question information indicating a question to be presented to a user with use of the selected attribute information piece; and
reflecting an attribute information piece indicated by a response of the user to the question information in the search criterion, thereby generating a new search criterion.

Supplementary Note 6

The search method according to supplementary note 5, wherein
in the calculating of the score, in a case where the number of the extracted search target information pieces is smaller than the search result range, the knowledge base is referenced, and a score is calculated for each attribute information piece in a node of a higher level or a node of the same level with use of an increase score function for increasing a search result.

Supplementary Note 7

The search method according to supplementary note 5 or 6, wherein
in the calculating of the score, in a case where the number of the extracted search target information pieces is larger than the search result range, the knowledge base is referenced, and a score is calculated for each attribute information piece in a node of a lower level with use of a reduction score function for reducing a search result.

Supplementary Note 8

The search method according to any one of supplementary notes 5 to 7, wherein
the search target information pieces are information pieces in which identification pieces for identifying the search target information pieces, the attribute information pieces, and portrait images related to the search target information pieces are associated.

Supplementary Note 9

A computer readable recording medium that includes a program recorded thereon, the program including instructions that cause a computer to carry out:
referencing a data set that includes search target information pieces in which an image and one or more attribute information pieces are associated with use of a search criterion that includes one or more attribute information pieces, and extracting search target information pieces that include the attribute information pieces that match the attribute information pieces of the search criterion;
in a case where the number of the extracted search target information pieces is not within a preset search result range, referencing a knowledge base in which attribute information pieces are classified hierarchically, and calculating a score for each of the attribute information pieces included in the extracted search target information pieces with use of a score function that has been determined in advance;
selecting an attribute information piece based on the calculated scores, and generating question information indicating a question to be presented to a user with use of the selected attribute information piece; and
reflecting an attribute information piece indicated by a response of the user to the question information in the search criterion, thereby generating a new search criterion.

Supplementary Note 10

The computer readable recording medium according to supplementary note 9, wherein
in the calculating of the score, in a case where the number of the extracted search target information pieces is smaller than the search result range, the knowledge base is referenced, and a score is calculated for each attribute information piece in a node of a higher level or a node of the same level with use of an increase score function for increasing a search result.

Supplementary Note 11

The computer readable recording medium according to supplementary note 9 or 10, wherein in the calculating of the score, in a case where the number of the extracted search target information pieces is larger than the search result range, the knowledge base is referenced, and a score is calculated for each attribute information piece in a node of a lower level with use of a reduction score function for reducing a search result.

Supplementary Note 12

The computer readable recording medium according to any one of supplementary notes 9 to 11, wherein
the search target information pieces are information pieces in which identification pieces for identifying the search target information pieces, the attribute information pieces, and portrait images related to the search target information pieces are associated.

Although the present invention of this application has been described with reference to example embodiments, the present invention of this application is not limited to the above example embodiments. Within the scope of the present invention of this application, various changes that can be understood by those skilled in the art can be made to the configuration and details of the present invention of this application.

INDUSTRIAL APPLICABILITY

As described above, according to the present invention, it is possible to obtain a search result efficiently by updating a search criterion based on a user's response to a question The present invention is useful in fields where it is necessary to perform searches efficiently.

REFERENCE SIGNS LIST

10 Search apparatus
11 Search target extraction unit
12 Score calculation unit
13 Question generation unit
14 Search criterion generation unit
15 Knowledge base
40 System
41 Input/output apparatus
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. A search apparatus, comprising:
one or more memories storing instructions; and
one or more processors configured to execute the instructions to:
reference a data set that includes search target information pieces in which an image and one or more attribute information pieces are associated with use of a search criterion that includes one or more attribute information pieces, and extract search target information pieces that include the attribute information pieces that match the attribute information pieces of the search criterion;

in a case where the number of the extracted search target information pieces is not within a preset search result range, reference a knowledge base in which attribute information pieces are classified hierarchically, and calculate a score for each of the attribute information pieces included in the extracted search target information pieces with use of a score function that has been determined in advance;
select an attribute information piece based on the calculated scores, and generate question information indicating a question to be presented to a user with use of the selected attribute information piece; and
reflect an attribute information piece indicated by a response of the user to the question information in the search criterion, thereby generate a new search criterion.

2. The search apparatus according to claim 1, further comprising
one or more processors is further configured to execute the instructions to,
in a case where the number of the extracted search target information pieces is smaller than the search result range, reference the knowledge base, and calculates a score for each attribute information piece in a node of a higher level or a node of the same level with use of an increase score function for increasing a search result.

3. The search apparatus according to claim 1, further comprising
one or more processors is further configured to execute the instructions to,
in a case where the number of the extracted search target information pieces is larger than the search result range, reference the knowledge base, and calculate a score for each attribute information piece in a node of a lower level with use of a reduction score function for reducing a search result.

4. The search apparatus according to claim 1, wherein
the search target information pieces are information pieces in which identification pieces for identifying the search target information pieces, the attribute information pieces, and portrait images related to the search target information pieces are associated.

5. A search method, comprising:
referencing a data set that includes search target information pieces in which an image and one or more attribute information pieces are associated with use of a search criterion that includes one or more attribute information pieces, and extracting search target information pieces that include the attribute information pieces that match the attribute information pieces of the search criterion;
in a case where the number of the extracted search target information pieces is not within a preset search result range, referencing a knowledge base in which attribute information pieces are classified hierarchically, and calculating a score for each of the attribute information pieces included in the extracted search target information pieces with use of a score function that has been determined in advance;
selecting an attribute information piece based on the calculated scores, and generating question information indicating a question to be presented to a user with use of the selected attribute information piece; and
reflecting an attribute information piece indicated by a response of the user to the question information in the search criterion, thereby generating a new search criterion.

6. The search method according to claim 5, wherein
in the calculating of the score, in a case where the number of the extracted search target information pieces is smaller than the search result range, the knowledge base is referenced, and a score is calculated for each attribute information piece in a node of a higher level or a node of the same level with use of an increase score function for increasing a search result.

7. The search method according to claim 5, wherein
in the calculating of the score, in a case where the number of the extracted search target information pieces is larger than the search result range, the knowledge base is referenced, and a score is calculated for each attribute information piece in a node of a lower level with use of a reduction score function for reducing a search result.

8. The search method according to claim 5, wherein
the search target information pieces are information pieces in which identification pieces for identifying the search target information pieces, the attribute information pieces, and portrait images related to the search target information pieces are associated.

9. A non-transitory computer readable recording medium that includes a program recorded thereon, the program including instructions that cause a computer to carry out:
referencing a data set that includes search target information pieces in which an image and one or more attribute information pieces are associated with use of a search criterion that includes one or more attribute information pieces, and extracting search target information pieces that include the attribute information pieces that match the attribute information pieces of the search criterion;
in a case where the number of the extracted search target information pieces is not within a preset search result range, referencing a knowledge base in which attribute information pieces are classified hierarchically, and calculating a score for each of the attribute information pieces included in the extracted search target information pieces with use of a score function that has been determined in advance;
selecting an attribute information piece based on the calculated scores, and generating question information indicating a question to be presented to a user with use of the selected attribute information piece; and
reflecting an attribute information piece indicated by a response of the user to the question information in the search criterion, thereby generating a new search criterion.

10. The non-transitory computer readable recording medium according to claim 9, wherein
in the calculating of the score, in a case where the number of the extracted search target information pieces is smaller than the search result range, the knowledge base is referenced, and a score is calculated for each attribute information piece in a node of a higher level or a node of the same level with use of an increase score function for increasing a search result.

11. The non-transitory computer readable recording medium according to claim 9, wherein
in the calculating of the score, in a case where the number of the extracted search target information pieces is larger than the search result range, the knowledge base is referenced, and a score is calculated for each attribute information piece in a node of a lower level with use of a reduction score function for reducing a search result.

12. The non-transitory computer readable recording medium according to claim 9, wherein
the search target information pieces are information pieces in which identification pieces for identifying the search target information pieces, the attribute information pieces, and portrait images related to the search target information pieces are associated.

\* \* \* \* \*